US008910248B2

(12) United States Patent
Higuchi et al.

(10) Patent No.: US 8,910,248 B2
(45) Date of Patent: Dec. 9, 2014

(54) TERMINAL CONNECTION STATUS MANAGEMENT WITH NETWORK AUTHENTICATION

(75) Inventors: Hidemitsu Higuchi, Ebina (JP); Motohide Nomi, Kawasaki (JP)

(73) Assignee: Alaxala Networks Corporation, Kawasaki (JP)

( * ) Notice: Subject to any disclaimer, the term of this patent is extended or adjusted under 35 U.S.C. 154(b) by 96 days.

(21) Appl. No.: 13/230,199

(22) Filed: Sep. 12, 2011

(65) Prior Publication Data

US 2012/0084840 A1    Apr. 5, 2012

(30) Foreign Application Priority Data

Oct. 4, 2010    (JP) ................. 2010-225111

(51) Int. Cl.
*H04L 29/06*    (2006.01)
*H04L 29/12*    (2006.01)
*H04L 12/931*    (2013.01)

(52) U.S. Cl.
CPC ............ *H04L 63/08* (2013.01); *H04L 61/2015* (2013.01); *H04L 49/354* (2013.01)
USPC .......... 726/4; 726/2; 726/3; 726/22; 709/223; 709/224; 709/225; 370/254; 370/390; 370/431; 370/432; 370/389; 370/395.53

(58) Field of Classification Search
USPC ............. 726/2–5, 22; 709/223–225; 370/254, 370/390, 431, 432, 389, 395.53
See application file for complete search history.

(56) References Cited

U.S. PATENT DOCUMENTS 5,668,952 A * 9/1997 Slane ............................. 709/245
8,107,396 B1 * 1/2012 Sharma ........................ 370/254

(Continued)

FOREIGN PATENT DOCUMENTS

JP    2003-348114    12/2003
JP    3154679    10/2009

OTHER PUBLICATIONS

Yun Yang; Jia Mi, "Design of DHCP protocol based on access control and SAKA encryption algorithm," Computer Engineering and Technology (ICCET), 2010 2nd International Conference on, vol. 6, no., pp. V6-264,V6-267, Apr. 16-18, 2010.*
Suzuki, S.; Kondo, S., "Dynamic Network Separation for IPv6 Network Security Enhancement," Applications and the Internet Workshops, 2005. Saint Workshops 2005. The 2005 Symposium on, vol., no., pp. 22,25, 31-04 Jan. 2005.*

(Continued)

*Primary Examiner* — Luu Pham
*Assistant Examiner* — Kari Schmidt
(74) *Attorney, Agent, or Firm* — Foley & Lardner LLP

(57) ABSTRACT

A network relay device includes a communication unit, an authentication processing unit, a DHCP snooping processing unit, and a terminal search processing unit. The authentication processing unit creates first information specifying an authenticated terminal device according to web authentication, and manages whether relay of communication data between a terminal device and a node on the specified network is permissible based on the first information. The DHCP snooping processing unit executes snooping of DHCP communication data between a terminal device and a DHCP server, and creates second information specifying a layer 3 address allocated to each terminal device. The terminal search processing unit specifies an authenticated terminal device based on the first information, specifies a layer 3 address allocated to the specified authenticated terminal device based on the second information, and causes the communication unit to send, to the specified layer 3 address, confirmation communication data.

9 Claims, 5 Drawing Sheets

(56) References Cited

U.S. PATENT DOCUMENTS

| | | | |
|---|---|---|---|
| 2004/0111640 A1* | 6/2004 | Baum | 713/201 |
| 2005/0198374 A1* | 9/2005 | Suzuki | 709/238 |
| 2005/0270992 A1* | 12/2005 | Sanzgiri et al. | 370/310.2 |
| 2006/0143440 A1* | 6/2006 | Ponnapalli et al. | 713/155 |
| 2006/0248229 A1* | 11/2006 | Saunderson et al. | 709/245 |
| 2007/0121617 A1* | 5/2007 | Kanekar et al. | 370/389 |
| 2007/0256122 A1* | 11/2007 | Foo et al. | 726/5 |
| 2008/0072285 A1* | 3/2008 | Sankaran et al. | 726/2 |
| 2008/0104046 A1* | 5/2008 | Singla et al. | 707/4 |
| 2009/0300178 A1* | 12/2009 | Saunderson et al. | 709/224 |
| 2009/0304008 A1* | 12/2009 | Kono et al. | 370/395.53 |
| 2010/0106824 A1* | 4/2010 | Friedrich et al. | 709/224 |
| 2011/0119735 A1* | 5/2011 | Higuchi et al. | 726/3 |

OTHER PUBLICATIONS

"Complete Analysis from Security, Management to QoS Latest Switch Unique Authentication Technology", Network Magazine, Japan, ASCII Corporation, Jan. 1, 2007, vol. 12, First Issue, p. 44-45.

"Switching/Port Authentication", CentreCOM 9424T/SP-E, 9424Ts/XP-E Command Reference 2.4, [Online], Feb. 20, 2008, Rev. C. (Ver. 2.4.1J), [Retrieved on Dec. 28, 2012].

Decision of Rejection dated Apr. 9, 2013 issued in connection with Japanese Application No. 2010-225111, with English Translation.

Notification of Reasons for Rejection dated Jan. 15, 2013 issued in connection with Japanese Application No. JP2010-225111, with English Translation.

* cited by examiner

| MAC ADDRESS | VLAN NUMBER | PHYSICAL PORT NUMBER |
|---|---|---|
| MAC-A | 200 | 1 |
| MAC-B | 300 | 1 |
| MAC-C | 200 | 2 |

Fig.4

| MAC ADDRESS | IP ADDRESS | VLAN NUMBER | PHYSICAL PORT NUMBER |
|---|---|---|---|
| MAC-A | IP-A | 200 | 1 |
| MAC-B | IP-B | 300 | 1 |
| MAC-C | IP-C | 200 | 2 |

Fig.5

| MAC ADDRESS | USER ID | VLAN NUMBER | PHYSICAL PORT NUMBER |
|---|---|---|---|
| MAC-A | USER A | 200 | 1 |
| MAC-B | USER B | 300 | 1 |
| MAC-C | USER C | 200 | 2 |

Fig.6

| MAC ADDRESS | IP ADDRESS | USER ID | VLAN NUMBER | PHYSICAL PORT NUMBER |
|---|---|---|---|---|
| MAC-A | IP-A | USER A | 200 | 1 |
| MAC-B | IP-B | USER B | 300 | 1 |
| MAC-C | IP-C | USER C | 200 | 2 |

TERMINAL CONNECTION STATUS MANAGEMENT WITH NETWORK AUTHENTICATION

CROSS REFERENCE TO RELATED APPLICATIONS

The present application claims the priority based on a Japanese Patent Application No. 2010-225111 filed on Oct. 4, 2010, the disclosure of which is hereby incorporated by reference in its entirety.

BACKGROUND

1. Technical Field

The present invention relates to network authentication, and particularly to management of the network connection status of a terminal device for which network authentication is already done.

2. Related Art

Amid the infrastructure shift of communication networks, various methods for increasing network security have been proposed. Network authentication is one of these. Network authentication is an authentication mechanism for managing whether or not a terminal device such as a personal computer (PC) or the like can be connected to a specific network (see JP2003-348114A, for example).

As network authentication, for example, Web authentication and IEEE 802.1X authentication are known. Web authentication is an authentication method for which an authentication server performs authentication based on authentication information of a terminal device in response to an authentication request issued from the terminal device that runs a Web browser to a network relay device such as a switch or the like that has a Web authentication function. With Web authentication, the network relay device registers the MAC address, user ID, VLAN information or the like of the authenticated terminal device to the authenticated terminal registration table and judges whether it is permissible to relay communication data between a terminal device and nodes on a network with reference to the table. Web authentication can be realized as long as the terminal device is equipped with a Web browser even if it is not equipped with special authentication software such as is used with IEEE 802.1X authentication, so this authentication method has high degree of general versatility.

With Web authentication, in contrast to an authentication method for which a protocol is established such as IEEE 802.1X authentication, a technology for managing the network connection status of already authenticated terminal devices is not known. For example, with Web authentication, a technology for quickly detecting that the authenticated terminal device has been detached from the network has not been established. When the fact that the authenticated terminal device has been detached from the network is not detected quickly, after the authenticated terminal device is detached from the network, there are cases when another terminal device fraudulently using the MAC address is allowed to connect to the network, so there was room for improvement in terms of security.

SUMMARY

By taking into account at least part of the problems noted above, an object of the present invention is to improve security on the network by managing the terminal connection status with Web authentication.

According to one aspect of the present invention, there is provided a network relay device comprising a communication unit, an authentication processing unit, a DHCP snooping processing unit, and a terminal search processing unit. The communication unit sends and receives communication data. The authentication processing unit creates first information specifying an authenticated terminal device according to a result of web authentication that determines whether or not a connection to a specified network by a terminal device connected to the network relay device is permissible, and manages whether or not relay of communication data between a terminal device and a node on the specified network by the communication unit is permissible based on the first information. The DHCP snooping processing unit executes snooping of DHCP communication data relayed by the communication unit between a terminal device and a DHCP server, and creates second information specifying a layer 3 address allocated to each terminal device based on the DHCP communication data. The terminal search processing unit specifies a terminal device that has already been authenticated based on the first information, specifies a layer 3 address allocated to the specified authenticated terminal device based on the second information, and causes the communication unit to send, to the specified layer 3 address, confirmation communication data for confirming whether or not the specified authenticated terminal is connected to the specified network.

With this network relay device, the terminal search processing unit specifies the authenticated terminal devices based on first information that specifies authenticated terminal devices created by the authentication processing unit, specifies a layer 3 address allocated to the authenticated terminal device based on second information that specifies a layer 3 address allocated to each terminal device created by the DHCP snooping processing unit, and causes the communication unit to send, to a specified layer 3 address, confirmation communication data that confirms whether the specified authenticated terminal device is connected to a specified network, so it is possible to manage whether an authenticated terminal device is connected to the network (in other words, the network connection status). Because of that, with this network relay device, it is possible to manage terminal connection status with Web authentication and improve security on a network.

In the network relay device described above, the terminal search processing unit may cause the authentication processing unit to cancel authentication for the specified authenticated terminal device when there is no response to the confirmation communication data sent a predetermined number of times from the specified authenticated terminal device.

With the network relay device, the terminal search processing unit causes the authentication processing unit to cancel the authentication for the authenticated terminal device when there is no reply from the authenticated terminal device in response to the confirmation communication data sent a predetermined number of times, so it is possible to suppress the occurrence of the circumstance that allows the connection to the network by another terminal which is fraudulently acting as the concerned terminal device after the authenticated terminal device has been detached from the network, making it possible to improve security on the network.

In the network relay device described above, the terminal search processing unit may create third information specifying a layer 3 address allocated for each authenticated terminal device based on the first information and the second information, and select authenticated terminal devices registered in the third information in sequence as a subject of confirmation of whether it is connected to the specified network.

With the network relay device, the terminal search processing unit creates third information specifying the layer 3 address allocated for each authenticated terminal device based on the first information and the second information, and select the authenticated terminal devices registered in the third information in sequence as the confirmation subjects, so it is possible to effectively and efficiently manage the terminal connection status of already authenticated terminal devices, making it possible to improve security on a network.

In the network relay device described above, the terminal search processing unit may register in the third information an authenticated terminal device when a terminal device is authenticated through the web authentication, and register in the third information a layer 3 address that is registered in the second information in cases when a layer 3 address is not registered in the third information for the authenticated terminal device selected as the confirmation subject, or when a layer 3 address registered in the third information is not identical with the layer 3 address registered in the second information.

With this network relay device, it is possible to register in the third information the authenticated terminal devices and the most recent layer 3 address allocated for each terminal device, so it is possible to effectively and efficiently manage the terminal connection status of the authenticated terminal devices using the third information, making it possible to improve the security on a network.

In the network relay device described above, the terminal search processing unit, for an authenticated terminal device selected as the confirmation subject, may determine that the selected authenticated terminal device has been reconnected after being detached once from the specified network, when a same correlation as a correlation of the authenticated terminal device and a layer 3 address registered in the third information is not registered in the second information, and a correlation of the authenticated terminal device and another layer 3 address is registered in the second information.

With this network relay device, it is possible to detect that an authenticated terminal device is reconnected after once being detached from a specified network, making it possible to further improve security on a network.

The network relay device described above may further comprise a VLAN setting unit for setting a VLAN to a terminal device so that a VLAN before authentication and a VLAN after authentication do not necessarily match.

With this network relay device, even when the VLAN of the terminal device is set so that the VLAN before authentication and the VLAN after authentication do not necessarily match, it is possible to specify a layer 3 address allocated to an authenticated terminal device and to send confirmation communication data that confirms whether an authenticated terminal device is connected to a specified network, making it possible to improve security on a network.

In the network relay device described above, the first information, the second information, and the third information may specify a terminal device using a layer 2 address.

The present invention can be realized in various aspects. For example, the present invention can be realized in aspects such as a network relay method and device; a network communication method and device; a network authentication method and device; a computer program for accomplishing the functions of such a method or device; a recording medium having such a computer program recorded thereon; and the like.

These and other objects, features, aspects, and advantages of the present invention will become more apparent from the following detailed description of the preferred embodiments with the accompanying drawings.

BRIEF DESCRIPTION OF THE DRAWINGS

FIG. 4 is an explanatory drawing showing an example of the contents of the DHCP snooping table DT;

FIG. 5 is an explanatory drawing showing an example of the contents of the authentication management table AT;

FIG. 6 is an explanatory drawing showing an example of the contents of the polling management table PT;

DESCRIPTION OF THE PREFERRED EMBODIMENTS

The embodiments of the present invention are described below in the indicated order:
A. Embodiment
A-1. Network System Configuration:
A-2. Web Authentication Process:
A-3. Terminal Search Process
B. Modifications:

A. Embodiment

Figure 1:
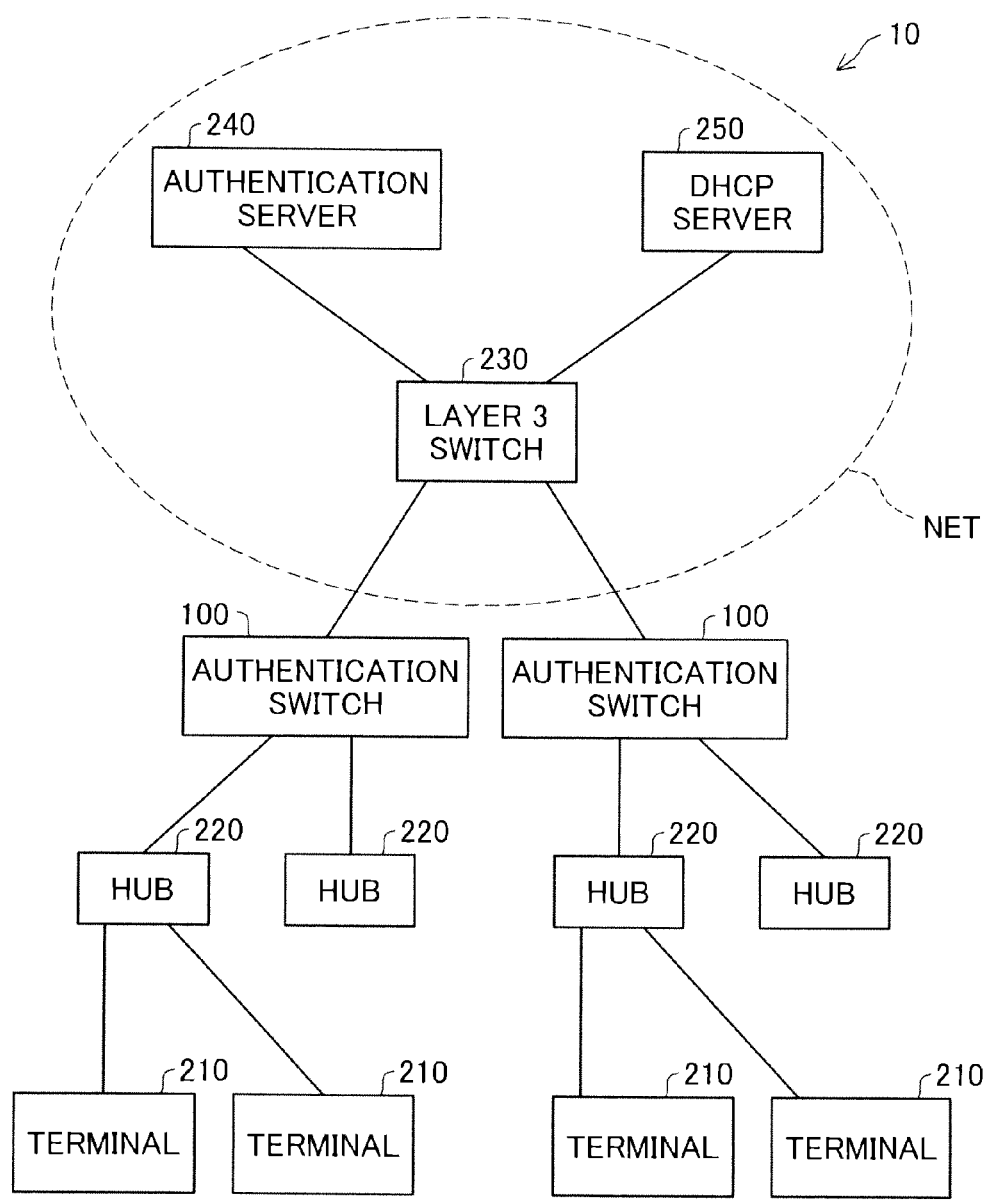
FIG. 1 is an explanatory drawing schematically showing the configuration of a network system 10 of an embodiment of the present invention.

A-1. Network System Configuration:

FIG. 1 is an explanatory drawing schematically showing the configuration of a network system 10 of an embodiment of the present invention. The network system 10 includes a terminal device 210, a hub 220 that is connectable to the terminal device 210, an authentication switch 100 that is connectable to the hub 220, a layer 3 switch 230 connected to the authentication switch 100, and an authentication server 240 and a DHCP server 250 connected to the layer 3 switch 230. Each structural element within the network system 10 is connected via a link. The link is a transmission path for communication data, and for example is constituted by a UTP cable, an STP cable, an optical fiber, a coaxial cable, wireless or the like.

The terminal device 210 is an information processing device used by a user, and for example is constituted by a personal computer (PC). The hub 220 is a network relay device that relays communication data on a network with a first layer (physical layer) of an OSI reference model. The authentication switch 100 is a network relay device (layer 2 switch) that relays communication data on a network with a second layer (data link layer) of an OSI reference model, and also has a network authentication function for managing whether a connection to a specified network NET by the terminal device 210 is permissible. The layer 3 switch 230 is a network relay device that relays communication data on a network with a third layer (network layer) of an OSI reference model. The authentication server 240 is a RADIUS server that performs Web authentication for determining whether a connection to the network NET by the terminal device 210 is permissible according to an authentication request from the authentication switch 100. The DHCP server 250 is a server that automatically allocates an IP address or the like as a layer 3 address to the terminal device 210.

Figures 2, 3:
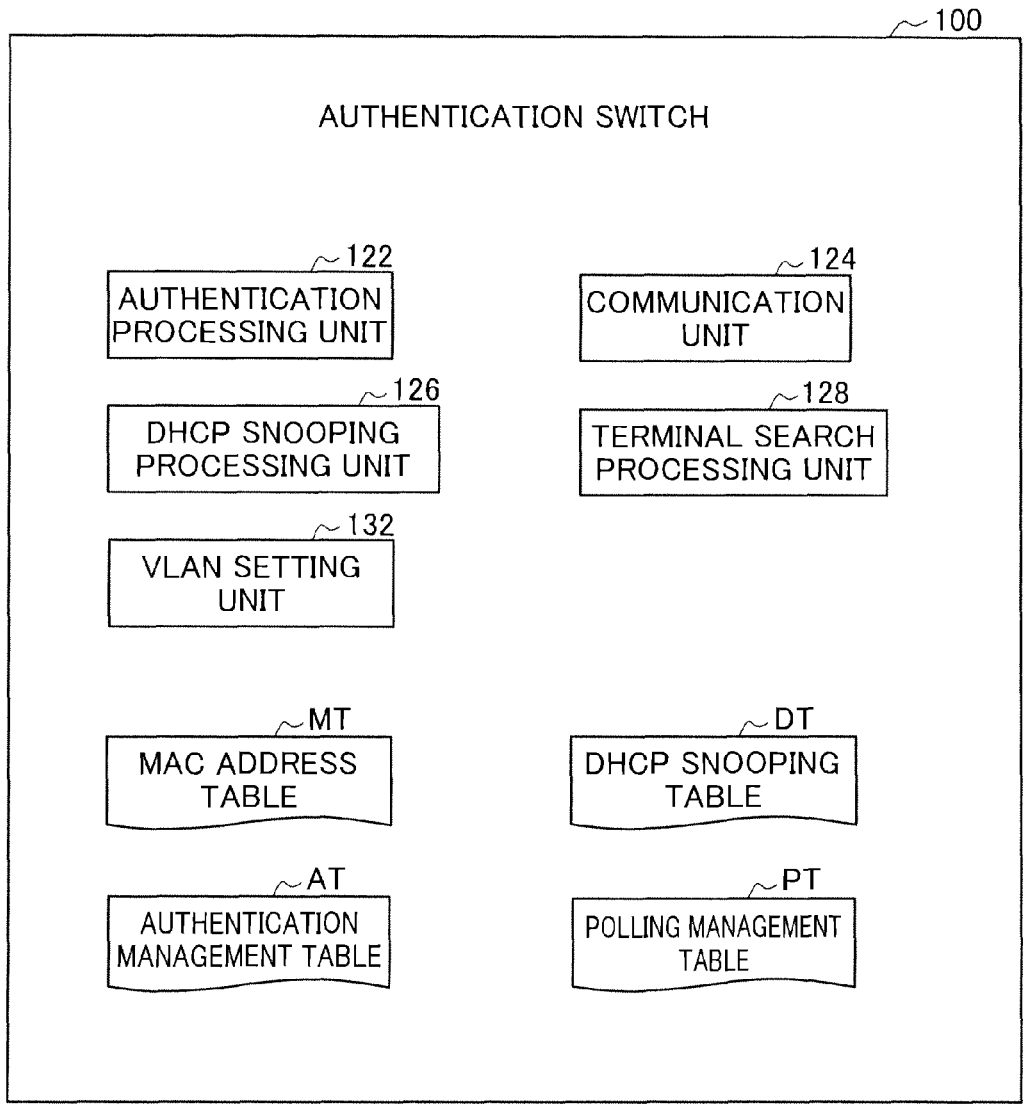
FIG. 2 is an explanatory drawing schematically showing the constitution of the authentication switch 100.
FIG. 3 is an explanatory drawing showing an example of the contents of the MAC address table MT.

FIG. 2 is an explanatory drawing schematically showing the constitution of the authentication switch 100. The authentication switch 100 includes a communication unit 124 and a MAC address table MT. The communication unit 124 has a plurality of physical ports (not illustrated), references the MAC address table MT, and performs sending and receiving of communication data via the physical ports. The communication unit 124 is constituted by an ASIC (application-specific IC) or the like.

FIG. 3 is an explanatory drawing showing an example of the contents of the MAC address table MT. The MAC address table MT stipulates a correlation of a MAC address as a layer 2 address of a terminal device 210, the number of a VLAN to which a terminal device 210 belongs, and the number of a physical port to which a terminal device 210 is connected. For example, with FIG. 3, the MAC address table MT shows that the terminal device 210 having the MAC address "MAC-A" belongs to the VLAN of VLAN no. "200", and is connected to the physical port of the port no. "1." Note that with this embodiment, the individual correlations in each table are also called records.

The communication unit 124, while performing sending and receiving of communication data, references information indicating a destination MAC address, a sending source MAC address, a VLAN no. and the like contained in the communication data, newly registers the records in the MAC address table MT, and updates already registered records. Also, with this embodiment, the communication unit 124 has an aging function of deleting from the MAC address table MT the records for MAC addresses for which communication data is not relayed during an aging time of a preset length.

The authentication switch 100 (FIG. 2) includes, as processing units for performing predetermined processes, an authentication processing unit 122, a DHCP snooping processing unit 126, a terminal search processing unit 128, and a VLAN setting unit 132. Each of these processing units is realized for example by a CPU (not illustrated) reading and executing a computer program stored in an internal memory. Also, the authentication switch 100 includes a DHCP snooping table DT, an authentication management table AT, and a polling management table PT as information used for each processing unit.

The DHCP snooping processing unit 126 detects DHCP communication data (DHCP message) between the terminal device 210 and the DHCP server 250 relayed via the communication unit 124, and creates or updates the DHCP snooping table DT based on the DHCP message. FIG. 4 is an explanatory drawing showing an example of the contents of the DHCP snooping table DT. The DHCP snooping table DT stipulates a correlation (record) of a MAC address of a terminal device 210, an IP address allocated to a terminal device 210, the number of a VLAN to which a terminal device 210 belongs, and the number of a physical port to which a terminal device 210 is connected. For example, with the example in FIG. 4, the DHCP snooping table DT shows that the terminal device 210 having the MAC address "MAC-A" belongs to the VLAN of VLAN no. "200", is connected to the physical port of port no. "1", and the IP address "IP-A" is allocated to the terminal device 210. Note that the DHCP snooping table DT corresponds to the second information of the present invention. When the communication unit 124 detects an IP address allocation message (DHCP ACK message) sent from the DHCP server 250 to a terminal device 210, the DHCP snooping processing unit 126 receives a copy of the detected message from the communication unit 124, and newly registers a record in the DHCP snooping table DT or updates an already registered record with reference to information indicating a destination MAC address or an allocation IP address or the like included in the detected message.

The authentication processing unit 122 works jointly with the authentication server 240 to perform Web authentication of a terminal device 210, creates an authentication management table AT that specifies an authenticated terminal devices according to the Web authentication results, and manages whether relay of communication data between a terminal device 210 and a nodes on the network NET is permissible by the communication unit 124 based on the authentication management table AT. FIG. 5 is an explanatory drawing showing an example of the contents of the authentication management table AT. The authentication management table AT stipulates a correlation (record) of a MAC address of an authenticated terminal device 210, a user ID that specifies a user of a terminal device 250, the number of a VLAN to which a terminal device 210 belongs, and the number of a physical port to which a terminal device 210 is connected. For example, with the example in FIG. 5, the authentication management table AT shows that the terminal device 210 having the MAC address "MAC-A" is already authenticated, and that it belongs to the VLAN with the VLAN no. "200" and is connected to the physical port with the port no. "1." Note that the authentication management table AT corresponds to the first information of the present invention. The authentication processing unit 122 newly registers a record to the authentication management table AT or deletes an already registered record according to the result of the Web authentication or to the result of the terminal search process described later. The Web authentication process using the authentication processing unit 122 is described later.

The terminal search processing unit 128 refers the polling management table PT to perform terminal search processing for confirming whether an authenticated terminal device 210 is connected to the network NET. FIG. 6 is an explanatory drawing showing an example of the contents of the polling management table PT. The polling management table PT stipulates a correlation (record) of a MAC address of a terminal device 210, an IP address allocated to a terminal device 210, a user ID of a user of a terminal device 210, the number of a VLAN to which a terminal device 210 belongs, and the number of a physical port to which a terminal device 210 is connected. Note that the polling management table PT corresponds to the third information of the present invention. The terminal search process by the terminal search processing unit 128 is described later.

The VLAN setting unit 132 sets a VLAN for each physical port of the communication unit 124. Note that the authentication switch 100 of this embodiment can selectively apply the fixed VLAN method for which the VLAN to which the terminal device 210 belongs does not change before and after authentication, or the dynamic VLAN method for which the VLAN to which the terminal device 210 belongs changes before and after authentication. With the description below, the dynamic VLAN method is selected for the authentication switch 100.

Figure 7:
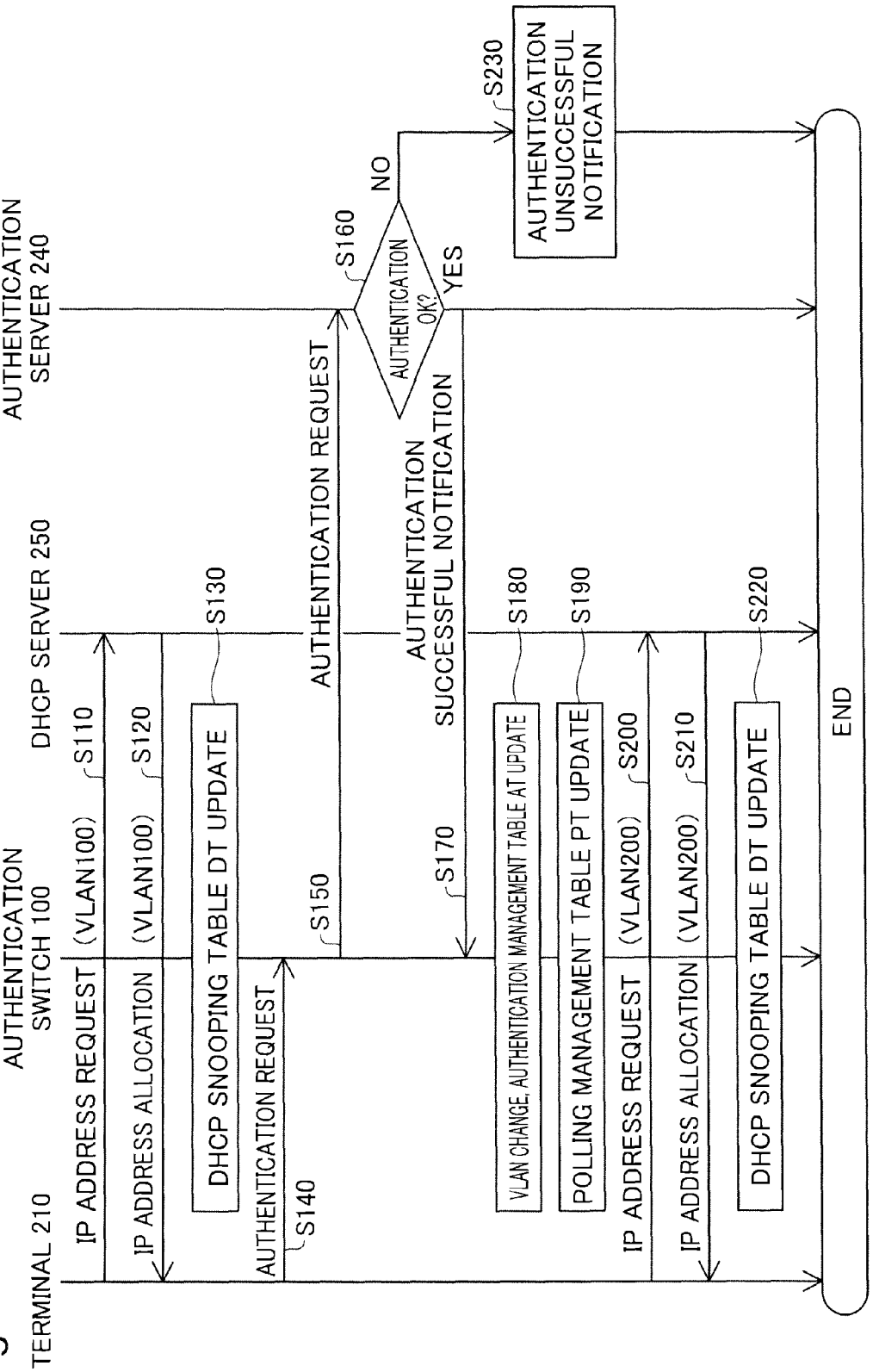
FIG. 7 is a flow chart showing the flow of the Web authentication process with the network system 10.

A-2. Web Authentication Process:

FIG. 7 is a flow chart showing the flow of the Web authentication process with the network system 10. The Web authentication process is a process that performs authentication of a terminal device 210 for managing whether it is permissible to connect to the network NET by the terminal device 210. Before execution of Web authentication regarding a certain terminal device 210, connection by the terminal device 210 (or another terminal device 210 fraudulently using the MAC address of the concerned terminal device 210) to the network NET is prohibited by the authentication switch 100.

When a user of a terminal device 210 connects the terminal device 210 to a hub 220, the VLAN setting unit 132 of the authentication switch 100 connected to the concerned hub 220 has the connected terminal device 210 belong to the VLAN for before authentication (with the example in FIG. 7, VLAN "100"). When the terminal device 210 makes a request for an IP address for before authentication to the DHCP server 250 with the VLAN for before authentication (step S110), the DHCP server 250 allocates an IP address to the terminal device 210 (step S120). The IP address allocated at this time is an IP address that has an IP subnet corresponding to the VLAN to which a terminal device belongs to before authentication, and is a temporary IP address for executing Web authentication. Note that as is well known, IP address allocation is realized by the following steps being executed in sequence: broadcasting of a DHCP Discover message by a terminal device 210, sending to the terminal device 210 of a DHCP Offer message notifying an allocatable IP address by the DHCP server 250 that received the Discover message, sending to the DHCP server 250 of a DHCP Request message that requests a specific IP address by the terminal device 210 that received the Offer message, and sending to the terminal device 210 of a DHCP ACK message that notifies an allocated IP address by the DHCP server 250 that received the Request message. The authentication switch 100 relays each DHCP message exchanged between the terminal device 210 and the DHCP server 250.

The DHCP snooping processing unit 126 of the authentication switch 100 executes snooping of each DHCP message, specifies the IP address allocated to the terminal device 210, correlates a specified IP address to the terminal device 210 MAC address, VLAN number or the like, and registers the correlation to the DHCP snooping table DT (FIG. 4) (step S130).

The terminal device 210 that received allocation of the IP address requests that the authentication switch 100 give authentication for connecting to the network NET through http/https (step S140). In specific terms, when the terminal device 210 operating a Web browser sends an authentication request packet to the authentication switch 100 using the allocated IP address, the authentication processing unit 122 having a function as a Web server sends the authentication information registration screen data to the terminal device 210. The terminal device 210 receives the authentication information registration screen data and displays it on the authentication information registration screen, and sends the authentication information input by the user on the screen (e.g. user ID and password) to the authentication switch 100.

When the authentication processing unit 122 of the authentication switch 100 receives authentication information from the terminal device 210, the authentication processing unit 122 transfers the authentication information to the authentication server 240 and requests authentication of the terminal device 210 (step S150). The authentication server 240 determines that the authentication of the terminal device 210 is unsuccessful when the authentication information of the terminal device 210 has not been registered in the authentication database (step S160: No). In this case, the authentication server 240 gives authentication unsuccessful notification to the authentication switch 100, and the authentication switch 100 gives authentication unsuccessful notification to the terminal device 210 (step S230).

On the other hand, the authentication server 240 determines that the authentication of the terminal device 210 is successful when the authentication information of the subject terminal device 210 has been registered in the authentication database (step S160: Yes). In this case, the authentication server 240 gives authentication successful notification to the authentication switch 100, and also notifies the authentication switch 100 information that specifies the VLAN to which the terminal device 210 belongs after authentication (with the example in FIG. 7, VLAN "200") (step S170). With this embodiment, the dynamic VLAN method is selected, so the VLAN to which the terminal device 210 belongs after authentication is different from the VLAN to which it belonged before authentication.

The authentication processing unit 122 of the authentication switch 100 that received the authentication successful notification changes the VLAN to which the terminal device 210 belongs to the VLAN notified from the authentication server 240, and notifies the change to the terminal device 210, and also does additional registration of a record regarding the authenticated terminal device 210 to the authentication management table AT (FIG. 5) (step S180). The terminal search processing unit 128 of the authentication switch 100 additionally registers in the polling management table PT (FIG. 6) a record corresponding to the record additionally registered in the authentication management table AT (step S190). Therefore, in the record additionally registered in the polling management table PT, the MC address, the user ID, the VLAN no., and the port no. are recorded, but at this point in time, the IP address is not recorded (it is a blank space).

The terminal device 210 that received the authentication successful notification makes a request for an IP address to the DHCP server 250 with the VLAN to which it newly belongs (with the example in FIG. 7, VLAN "200") (step S200). The DHCP server 250 that receives the request allocates an IP address to the terminal device 210 (step S210). The IP address allocated at this time is an IP address having an IP subnet corresponding to the VLAN to which the terminal device 210 belongs after authentication.

At this time, the DHCP snooping processing unit 126 of the authentication switch 100, the same as before authentication, executes snooping of each DHCP message exchanged between the terminal device 210 and the DHCP server 250, specifies the IP address allocated to the terminal device 210, correlates the specified IP address to the terminal device 210 MAC address, VLAN no. or the like, and registers the correlation to the DHCP snooping table DT (FIG. 4) (step S220). The record regarding this terminal device 210 is already registered in the DHCP snooping table DT, and the DHCP snooping processing unit 126 updates to the IP address and VLAN no. for this record after authentication.

With the Web authentication process described above, authentication of the terminal device 210 is performed, and the IP address for use after authentication is allocated to the terminal device 210 for which authentication was successful. The authentication switch 100 relays communication data between the authenticated terminal device 210 and nodes on the network NET. By doing this, it is possible to connect to the network NET by the terminal device 210.

Figure 8:
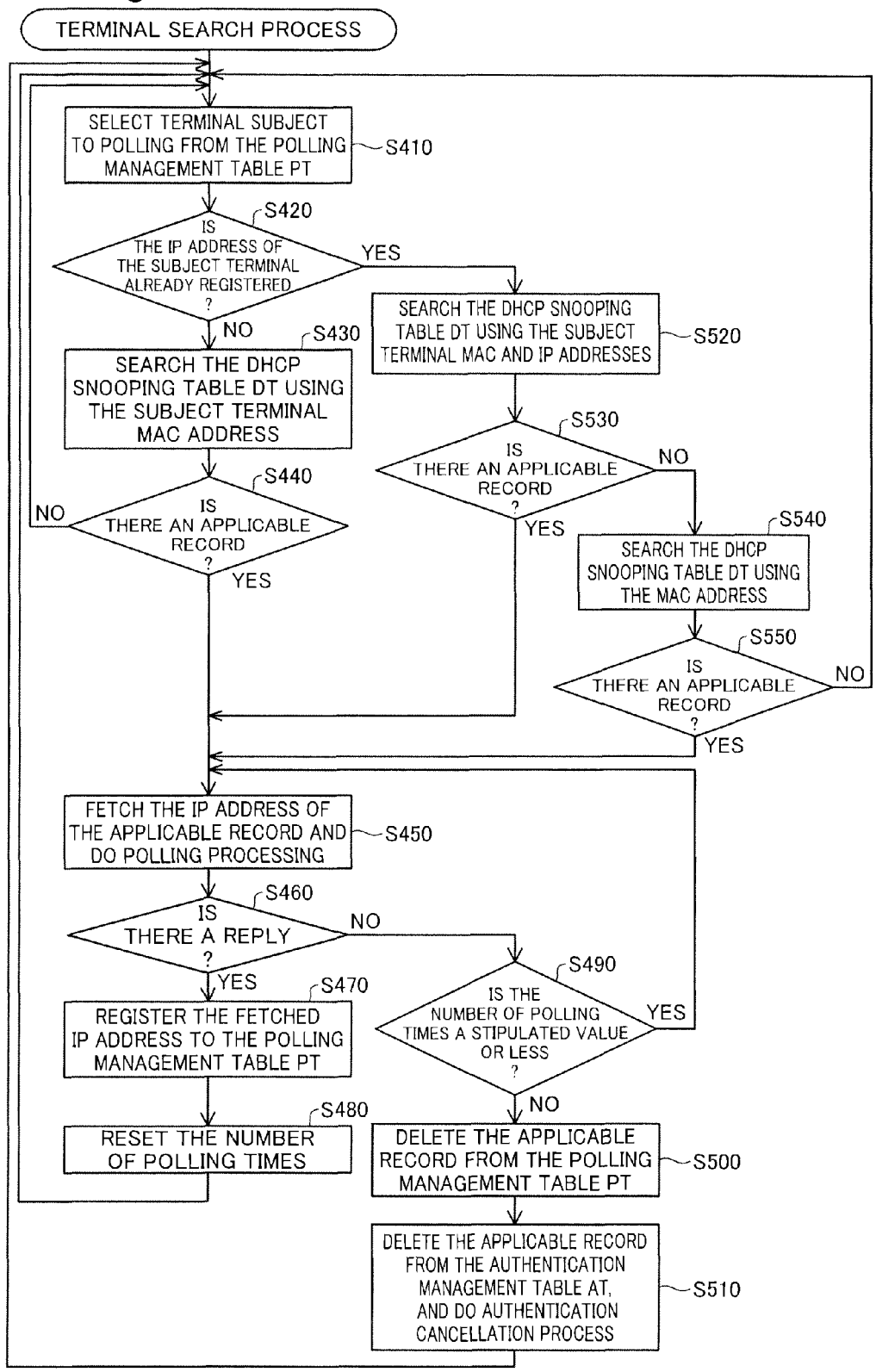
FIG. 8 is a flow chart showing the flow of the terminal search process by the authentication switch 100 of this embodiment.

A-3. Terminal Search Process:

FIG. 8 is a flow chart showing the flow of the terminal search process by the authentication switch 100 of this embodiment. The terminal search process is a process which confirms whether the authenticated terminal device 210 is still connected to the network NET, and cancels authentication for terminal devices 210 determined to already be detached from the network NET.

By selecting one record registered in the polling management table PT at a specified timing, the terminal search processing unit 128 of the authentication switch 100 sets the terminal device 210 corresponding to the MAC address of the selected record as the terminal device subject to polling (step S410). Note that as described above, because records are additionally registered to the polling management table PT corresponding to the records additionally registered to the authentication management table AT at the time authentication is successful, the terminal device 210 corresponding to the MAC address of the record registered to the polling management table PT is an authenticated terminal device 210. That is, the terminal search processing unit 128 selects one authenticated terminal device 210 as the terminal device subject to polling with reference to the polling management table PT created based on the authentication management table AT.

The terminal search processing unit 128 determines whether the IP address of the terminal device subject to polling is registered in the polling management table PT (step S420). Note that when the terminal device 210 is set to be the terminal device subject to polling for the first time after authentication, the IP address is not registered in the polling management table PT.

When the IP address of the terminal device 210 is not registered in the polling management table PT, the terminal search processing unit 128 searches the DHCP snooping table DT using the MAC address registered in the polling management table PT as the key for search (step S430). When a record corresponding to the concerned MAC address is detected in the DHCP snooping table DT (step S440: Yes), the terminal search processing unit 128 performs polling processing using the IP address of the detected record (step S450). Here, polling processing is the process of causing the communication unit 124 to send a confirmation packet requesting a reply to the IP address of the detected record as the destination address.

When there is a reply to the confirmation packet from the terminal device 210 (step S460: Yes), the terminal device 210 is confirmed to be connected to the network NET. In this case, the terminal search processing unit 128 additionally registers the detected IP address in the record corresponding to the terminal device subject to polling with the polling management table PT (step S470). By doing this, the correlation of the MAC address and the IP address for the terminal device subject to polling is registered in the polling management table PT. After that, the terminal search processing unit 128 resets the number of polling times of the concerned terminal device 210 (step S480), and performs the process of selecting the next terminal device subject to polling (step S410).

When there is no reply to the confirmation packet from the terminal device 210 (step S460: No), the terminal search processing unit 128 repeatedly executes the polling process (step S450) and the determination of if there is a reply (step S460) until the polling process execution count (number of times the confirmation packet is sent) exceeds a preset stipulated value. When the polling process execution count exceeds the stipulated value (step S490: No), the terminal search processing unit 128 judges that the terminal device 210 has already been detached from the network NET. In this case, the terminal search processing unit 128 deletes the record regarding the concerned terminal device 210 from the polling management table PT (step S500), and causes the authentication processing unit 122 to cancel the authentication of the concerned terminal device 210 by deleting the record for the concerned terminal device 210 from the authentication management table AT (step S510). By doing this, the connection by the concerned terminal device 210 (or another terminal device 210 fraudulently using the MAC address of the concerned terminal device 210) to the network NET is prohibited by the authentication switch 100.

Note that with the DHCP snooping table DT search (step S430) using the MAC address of the terminal device 210 registered in the polling management table PT as the key for search, when a record corresponding to the concerned MAC address is not detected (step S440: No), the process returns to selection of the next terminal device subject to polling (step S410).

With the determination of whether the IP address of the terminal device subject to polling is registered in the polling management table PT (step S420), when the IP address is already registered in the polling management table PT, the terminal search processing unit 128 searches the DHCP snooping table DT using a combination of the MAC address and IP address of the terminal device subject to polling registered in the PT as the key for search (step S520). When a record corresponding to the concerned combination is detected in the DHCP snooping table DT (step S530: Yes), the terminal detection processing unit 128 performs polling processing using the IP address registered in the polling management table PT (in other words, the IP address registered in the DHCP snooping table DT), and performs the same processing as described above according to whether there is a reply to the polling process (steps S460 to S510).

With the DHCP snooping table DT search using a combination of the MAC address and IP address of the terminal device subject to polling registered in the polling management table PT (step S520), when an applicable record is not detected (step S530: No), the terminal search processing unit 128 searches the DHCP snooping table DT using only the MAC address of the terminal device subject to polling as the key for search (step S540). When there is no applicable record in the DHCP snooping table DT (step S550: No), it is conceivable that the polling terminal device has not yet fetched the IP address using DHCP, so confirmation of the connection status is put off until later, and the process returns to selection of the next terminal device subject to polling (step S410).

On the other hand, when an applicable record is detected in the DHCP snooping table DT (step S550: Yes), the terminal search processing unit 128 determines that the terminal device subject to polling was detached once from the network NET, has been reconnected to the network NET via the same physical port as before detachment or another physical port, and has fetched a new IP address. In this case, polling processing (step S450) is performed using the IP address registered in the record detected with the DHCP snooping table DT, and the same process as described above is performed according to whether there is a reply to the polling process (steps S460 to S510).

As described above, with the terminal search process by the authentication switch 100 of this embodiment, the terminal search processing unit 128 selects one authenticated terminal device 210 as the terminal device subject to polling using the polling management table PT created based on the authentication management table AT, specifies the IP address allocated to the terminal device subject to polling using the DHCP snooping table DT, and causes the communication unit to send, to the specified IP address, a confirmation packet confirming whether the terminal device subject to polling is connected to the network NET. Consequently, the authentication switch 100 is able to manage whether the authenticated terminal device 210 is still connected to the network NET (in other words, the terminal connection status). Thus, with the authentication switch 100 of this embodiment, it is possible to suppress the occurrence of the situation that allows the connection to the network NET by another terminal device 210 fraudulently using the MAC address of the concerned terminal device 210 after the authenticated terminal device 210 is detached from the network NET, making it possible to improve the security on the network.

More specifically, when there is no reply from the terminal device 210 to the confirmation packet sent a predetermined number of times, the authentication switch 100 determines that the terminal device 210 has already been detached from the network NET, and cancels the authentication for the concerned terminal device 210. Consequently, with the authentication switch 100 of this embodiment, it is possible to quickly detect that the authenticated terminal device 210 is detached from the network NET, and it is possible to quickly cancel authentication for the terminal device 210 that is detached from the network NET, making it possible to improve security on the network.

Note that the DHCP snooping function of executing snooping of DHCP messages exchanged between the terminal device 210 and the DHCP server 250 and the DHCP relay function of relaying DHCP messages exchanged between the terminal device 210 and the DHCP server 250 are already known technologies, and it is possible to detect the IP address of the terminal device 210 using these functions. However, the DHCP relay function and the DHCP snooping function cannot detect whether the terminal device 210 is authenticated or not. Also, with the authentication switch 100 of this embodiment, the dynamic VLAN method is selected, for which the VLAN to which the terminal device 210 belongs before and after authentication is changed and the IP address allocated to the terminal device 210 is also changed. Furthermore, when the authenticated terminal device 210 is reconnected to the network NET after being detached from the network NET, the IP address of the terminal device 210 may be changed. Because of that, it has not been possible to manage the network connection status of authenticated terminal devices 210 by simply detecting the IP address of the terminal device 210 using the DHCP relay function or the DHCP snooping function. With the authentication switch 100 of this embodiment, by using the polling management table PT created based on the authentication management table AT, it is possible to grasp the situation of the authenticated terminal device 210, and by specifying the IP address allocated to the authenticated terminal device 210 using the DHCP snooping table DT, it is possible to manage the network connection status of the authenticated terminal device 210 even in an environment for which the IP address of the terminal device 210 may be changed, so it is possible to improve the security of the network.

Also, with the authentication switch 100, using the aging function of the MAC address table MT, it is possible that authentication will be cancelled for the terminal device 210 corresponding to the MAC address deleted by the aging function, but in this case, even if it is a terminal device 210 that has not actually been detached from the network NET, it is possible for the authentication of the terminal device 210 to be cancelled for example if the user is away from his desk or the like and communication was not performed. In a case such as this, it is necessary to execute Web authentication of the terminal device 210 again. When the aging time is set longer to avoid the occurrence of this kind of circumstance, it is not possible to sufficiently increase the security of the network. On the other hand, when the aging time is set shorter, it is possible that the aforementioned circumstance will occur and the user will lose convenience, and also, it is possible that there will be an increase in the communication load because of flooding processing to transfer all the communications related to the terminal device 210 having the deleted MAC address to the all VLAN, so this is not desirable. The authentication switch 100 of this embodiment regularly sends a confirmation packet to the authenticated terminal device 210 connected to the network NET, so it is possible to suppress the occurrence of the circumstance of cancellation of the authentication of the terminal device 210 that is not detached from the network NET through aging processing.

Also, with the authentication switch 100 of this embodiment, when the same correlation as the correlation of the MAC address and the IP address registered in the polling management table PT is not registered in the DHCP snooping table DT regarding the authenticated terminal device 210 selected as the terminal device subject to polling, and the correlation of the concerned MAC address and another IP address is registered in the DHCP snooping table DT, the selected authenticated terminal device 210 is determined to have been reconnected after once being detached from the network NET. Thus, with the authentication switch 100 of this embodiment, it is possible to detect detachment or movement of the authenticated terminal device 210, and it is possible to further improve the security of the network.

B. Modifications

The invention is not limited to the embodiment and its applications discussed above but may be actualized in diversity of other embodiments and applications within the scope of the invention. Some examples of possible modification are given below.

B1. Modification 1

The configuration of the network system 10 with the embodiments noted above is nothing more than an example, and various modifications are possible. For example, the network system 10 shown in FIG. 1 is equipped with a plurality of terminal devices 210 and authentication switches 100, but the network system 10 can also be equipped respectively with at least one terminal device 210 and authentication switch 100. Also, with the network system 10, the terminal device 210 and the authentication switch 100 can also be directly connected without going via a hub 220. Also, with the network system 10, the authentication server 240 and the DHCP server 250 can also be connected with the layer 3 switch 230 via another node.

The authentication switch 100 can also have a function as an L3 switch. Alternatively, the authentication switch 100 can also have a function as an authentication server and a DHCP server. In this case, the Web authentication process can also be executed using the authentication server function and/or the DHCP server function that the authentication switch 100 has.

B2. Modification 2

The contents of each table (MAC address table MT, DHCP snooping table DT, authentication management table AT, polling management table PT (FIG. 3 to 6)) with the embodiments noted above are nothing more than examples, and it is also possible for each table to not include a portion of the contents shown in the drawings, or to include contents other than the contents shown in the drawings.

B3. Modification 3

With the embodiments noted above, the terminal search processing unit 128 generates the polling management table PT based on the authentication management table AT and the DHCP snooping table DT, and performs terminal search processing using the polling management table PT, but the terminal search processing unit 128 can also be an item that does not generate the polling management table PT, and that uses the authentication management table AT and the DHCP snooping table DT to perform terminal search processing in the same way.

B4. Modification 4

With the terminal search process of the embodiments noted above (FIG. 8), the next processing contents change according to the results of the determination of whether the IP address of the terminal device subject to polling is registered in the poling management table PT (step S420), but it is also possible to execute the DHCP snooping table DT search (step S430) using the MAC address of the terminal device subject to poling as the key for search regardless of whether the IP address of the terminal device subject to polling is registered in the poling management table PT (the determination of step S420 is not executed). However, as with the embodiments noted above, when the determination of step S420 is executed, and the IP address of the terminal device subject to polling is registered in the polling management table PT, if the DHCP snooping table DT search (step S520) is executed using the combination of the MAC address and IP address of the terminal device subject to poling as the key, it is possible to detect that the authenticated terminal device 210 once detached from the network NET is reconnected, so this is desirable.

B5. Modification 5

With the embodiments noted above, we described an example using the dynamic VLAN method, but even in cases when the fixed VLAN method is used, by doing the terminal search processing of this embodiment, it is possible to manage whether the authenticated terminal device 210 is connected to the network NET (terminal connection status), making it possible to improve security on the network.

B6. Modification 6

With the embodiments noted above, the MAC address is used as the layer 2 address, and the IP address is used as the layer 3 address, but it is also possible to use as appropriate the address according to the protocol used for the Web authentication process or terminal search process as the layer 2 address and layer 3 address.

B7. Modification 7

Some of the features implemented through hardware in the embodiments noted above may be replaced by software, and conversely some of the features implemented through software may be replaced by hardware.

What is claimed is:

1. A cryptographic apparatus, comprising:
the one or more computers comprising one or more processors configured with: a communication unit configured to send and receive communication data; an authentication processing unit configured to create first information specifying an authenticated terminal device according to a result of web authentication that determines whether or not a connection to a specified network by a terminal device connected to the network relay device is permissible, and manage authentication status of a terminal device indicating whether or not relay of communication data between the terminal device and a node on the specified network by the communication unit is permissible based on the first information and update the authentication status of the terminal device;
a Dynamic Host Configuration Protocol (DHCP) snooping processing unit configured to execute snooping of DHCP communication data relayed by the communication unit between the terminal device and a DHCP server, and create second information specifying a layer 3 address allocated to each terminal device based on the DHCP communication data; and
a terminal search processing unit configured to specify the terminal device that has already been authenticated based on the first information, specify a layer 3 address allocated to the specified authenticated terminal device based on the second information, and send, via the communication unit, to the specified layer 3 address, confirmation communication data for confirming whether or not the specified authenticated terminal is connected to the specified network, and update the authentication status for the specified authenticated terminal.

2. The network relay device according to claim 1, wherein the authentication processing unit is configured to cancel authentication for the specified authenticated terminal device in the authentication status when there is no response to the confirmation communication data sent a predetermined number of times from the specified authenticated terminal device.

3. The network relay device according to claim 1, wherein the terminal search processing unit is configured to create third information specifying a layer 3 address allocated for each authenticated terminal device based on the first information and the second information, and select authenticated terminal devices registered in the third information in sequence as a subject of confirmation of whether it is connected to the specified network.

4. The network relay device according to claim 3, wherein the terminal search processing unit is configured to register in the third information an authenticated terminal device when a terminal device is authenticated through the web authentication, and register in the third information a layer 3 address that is registered in the second information in cases when a layer 3 address is not registered in the third information for the authenticated terminal device selected as the confirmation subject, or when a layer 3 address registered in the third information is not identical with the layer 3 address registered in the second information.

5. The network relay device according to claim 4, wherein the terminal search processing unit is configured to, for an authenticated terminal device selected as the confirmation subject, determine that the selected authenticated terminal device has been reconnected after being detached once from the specified network, when a same correlation as a correlation of the authenticated terminal device and a layer 3 address registered in the third information is not registered in the second information, and a correlation of the authenticated terminal device and another layer 3 address is registered in the second information.

6. The network relay device according to claim 1, further comprising: a VLAN setting unit configured to set a VLAN to a terminal device so that a VLAN before authentication and a VLAN after authentication do not necessarily match.

7. The network relay device according to claim 1, wherein the first information, the second information, and the third information specify a terminal device using a layer 2 address.

8. A network relay method, comprising the steps of: creating first information specifying an authenticated terminal device according to a result of web authentication that determines whether or not a connection to a specified network by a terminal device is permissible, and managing authentication status of the terminal device indicating whether or not relay of communication data between the terminal device and a node on the specified network is permissible based on the first information;
executing snooping of Dynamic Host Configuration Protocol (DHCP) communication data relayed between the terminal device and a DHCP server, and creating second information specifying a layer 3 address allocated to each terminal device based on the DHCP communication data;

specifying the terminal device that has already been authenticated based on the first information, specifying a layer 3 address allocated to the specified authenticated terminal device based on the second information, and sending, to the specified layer 3 address, confirmation communication data for confirming whether or not the specified authenticated terminal is connected to the specified network; and updating the authentication status for the specified authenticated terminal based on whether a response for the confirmation communication data is received or not.

9. The network relay method according to claim 8, wherein the step of updating the authentication status further comprises:

canceling authentication for the specified authenticated terminal device in the authentication status when there is no response to the confirmation communication data sent a predetermined number of times from the specified authenticated terminal device.

\* \* \* \* \*